United States Patent Office 3,361,758
Patented Jan. 2, 1968

3,361,758
METHOD FOR MAKING PHTHALOCYANINE DYESTUFFS
Gordon A. Geselbracht and Wilson J. Bryan, Jr., Charlotte, N.C., assignors to Martin-Marietta Corporation, a corporation of Maryland
No Drawing. Filed Dec. 20, 1965, Ser. No. 515,161
5 Claims. (Cl. 260—314.5)

ABSTRACT OF THE DISCLOSURE

There is disclosed herein a method for making water insoluble, sulfide soluble dyestuffs of the phthalocyanine series having at least one pendant thiocyanate group per phthalocyanine molecule, comprising the step of reacting at an elevated temperature ammonium thiocyanate or thiourea and a solution of a phthalocyanine sulfinate, nickel phthalocyanine sulfinate or copper phthalocyanine sulfinate, wherein the sulfinate groups are pendant and are substituents for hydrogen in the arylene nuclei of the phthalocyanines. The phthalocyanines may contain pendant thiosulfonate groups or pendant sulfonate groups in addition to the sulfinate groups. Solubilization of the resulting dye to its leuco form with sodium sulfide, and production of wet-fast green dyeings with the dyestuff on cotton fabric is also disclosed.

---

The present invention relates to dyes, and more particularly to a method for making phthalocyanine dyestuffs.

The method of the present invention is particularly characterized in that it is a method for making a water insoluble, sulfide soluble dyestuff of the phthalocyanine series characterized by the presence of at least one pendant thiocyanate group (SCN) per phthalocyanine molecule, comprising the step of reacting ammonium thiocyanate or thiourea at an elevated temperature with a solution of a phthalocyanine sulfinate, nickel phthalocyanine sulfinate, or copper phthalocyanine sulfinate, wherein the sulfinate groups are pendant and are substituents for hydrogen in the arylene nuclei of the phthalocyanines.

If desired, the phthalocyanine sulfinates used herein may contain pendant thiosulfonate groups ($SO_2$—S—Na) or pendant sulfonate groups ($SO_3Na$) in addition to the sulfinate groups ($SO_2$—Na). In that case, pendant thiocyanate groups are formed at the site of the sulfinate and thiosulfonate groups, and the sulfonate groups are unreacted.

The water insoluble dyestuffs produced according to the present invention may be used as pigments for coloring textiles; or, they may be solubilized to the leuco form with aqueous $Na_2S$ or aqueous NaSH plus NaOH, padded onto cotton fabric, dried, padded through mild NaSH and caustic, steamed, and oxidized with sodium bichromate and acetic acid to make valuable wet-fast green dyeings.

U.S. Patent 2,395,117, issued Feb. 19, 1946 discloses that amino-phthalocyanines may be diazotized, and that the diazonium salt may be reacted with an alkali metal thiocyanate to produce thiocyanates of phthalocyanines. The primary difficulty with this method is that amino-phthalocyanines are extremely expensive. Additional difficulties are that phthalocyanine diazonium salts are liable to decompose and contaminate the resulting product.

According to the method of the present invention, use of expensive amino-phthalocyanines and unstable phthalocyanine diazonium salts is avoided, and thiocyanates of phthalocyanines may be produced in a relatively inexpensive manner.

The following is a more detailed description of the method of the present invention.

The starting phthalocyanine is a sulfinate of phthalocyanine, nickel phthalocyanine, or copper phthalocyanine. It contains at least one pendant sulfinate group per phthalocyanine molecule, and the pendant sulfinate groups are substituents for hydrogen in the arylene nuclei of the phthalocyanines. If desired, the phthalocyanine sulfinate may in addition have pendant sulfonate or pendant thiosulfonate groups as substituents for hydrogen in the arylene nuclei of the phthalocyanine molecule.

Phthalocyanine sulfinate and methods for making same are disclosed in British patent specification No. 960,643, published June 10, 1964, and may be used in carrying out the method of the present invention.

Also, phthalocyanine sulfinates of the formula

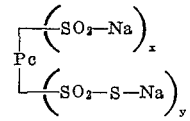

which may be prepared by a process comprising the step of reducing $Pc(SO_2Cl)_n$ in aqueous medium at pH 4–10 with an excess of NaSH or $Na_2S$, wherein Pc is the radical of phthalocyanine, copper phthalocyanine or nickel phthalocyanine, $x$ is a number from 1.2–2.3, $y$ is a number from 0.8–2.3, $n$ is a number from 2–4, and $x+y=n$, may be used in carrying out the method of the present invention.

The phthalocyanine sulfinate is dissolved in water, or in a suitable organic solvent such as dimethyl formamide or dimethyl sulphoxide. Suitable organic solvents are those in which the reactants are soluble, which do not react with the reactants, and which have a boiling point of at least 135° C. under the reaction conditions. It is desirable that the solvent be one in which the final product is insoluble, for ease in isolating the product.

Ammonium thiocyanate or thiourea is then added to the solution of the phthalocyanine sulfinate. It is suggested that an excess of ammonium thiocyanate or thiourea be used; by excess, we mean that more than the theoretical amount required to complete the reaction be employed. A suitable range would be about 5–10 gram molecular weights of ammonium thiocyanate or thiourea per gram molecular weight of the phthalocyanine sulfinate selected multiplied by the sum of the sulfinate and thiolsulfonate groups per molecule of phthalocyanine. For example, if 1 g.m.w. of

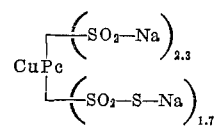

wherein CuPc is the radical of copper phthalocyanine, were employed, 20–40 g.m.w. of ammonium thiocyanate or thiourea would be a suitable range.

If desired, ammonia or other inorganic ammonium salts which are salts of weak acids, such as ammonium carbonate or ammonium bicarbonate, may be used in addition to the ammonium thiocyanate or thiourea, for the purpose of economically lowering the amount of ammonium thiocyanate or thiourea which would otherwise be employed, in which case the above 5–10 g.m.w. range for thiourea or ammonium thiocyanate may be lowered to 2–10 g.m.w.

It is suggested that the composition for the reaction be at pH 5–10, and preferably about pH 7–9, when the reaction commences. The reactants will usually be within this range, but if not an alkali or acid binding agent, such as NaOH, Na₂S, or Na₂CO₃ can be employed to adjust the pH to the desired range.

The reaction is conducted at an elevated temperature, preferably within the range of about 135°–225° C. If water is used as the solvent, about 35–375 p.s.i.g. pressure results when the desired temperature of 135°–225° C. is obtained. If dimethylformamide or dimethyl sulphoxide are used as the solvent, a desirable reaction temperature of 135°–155° C. may be obtained without conducting the reaction under elevated pressure.

The composition is heated until reaction is complete. Completion of the reaction is indicated by precipitation of the product. The length of time during which the composition is heated depends, of course, on the temperature employed. In general, heating may be from about 20 minutes–24 hours. For example, with water as the solvent at 200°–225° C. the reaction is practically instantaneous, but the composition is preferably heated 20–30 minutes to insure completion of the reaction; with dimethyl formamide or dimethyl sulphoxide as the solvent at 156° C. the reaction is essentially complete in one hour, but the composition is preferably heated 15–20 hours to insure completion of the reaction. With dimethyl formamide or dimethyl sulphoxide as the solvent at 145°–150° C. the reaction is essentially complete in 2 hours, but the composition is preferably heated 18–24 hours to insure completion of the reaction.

Following completion of the reaction, the product is isolated as solids. For example, the slurry containing the product is cooled below 50° C., the product collected in solids form by filtration, and the solids washed with water at room temperature and dried.

The product may be marketed as solids, or it may be reduced to the leuco form with aqueous Na₂S and marketed as a concentrated pre-reduced liquid dye.

It should be pointed out that while according to the present process pendant thiocyanate groups are formed at the site of the sulfinate and thiosulfonate groups of the phthalocyanine in some sort of replacement reaction, it is unknown whether the thiocyanate groups are attached directly as substituents for hydrogen in the arylene nuclei of the phthalocyanine or whether there are bridging members, such as —SO₂—, etc., interposed between the thiocyanate groups and the arylene nuclei.

The following are illustrative examples.

Example 1

A water insoluble sulfide soluble, copper phthalocyanine dye having 4 pendant thiocyanate groups per molecule may be prepared as follows.

97 gms. copper phthalocyanine tetra-(4)-sulfonyl chloride are stirred with ice and water to 600 ml. volume at 0° C., and 3 drops tributyl phosphate anti-foaming agent are added. The pH is adjusted to 5 by adding 15% aqueous NaOH at room temperature to the cold mass. 69.1 gms. Na₂S dissolved in 300 ml. water at room temperature, and enough ice to maintain the mass at 0° C. during addition of the Na₂S, are added. The mass is stirred 12–15 hours while permitting it to warm to room temperature naturally. An aqueous solution of

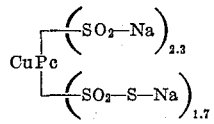

wherein CuPc is the radical of copper phthalocyanine, results.

To the above resulting copper phthalocyanine sulfinate solution are added 307 gms. technical grade ammonium thiocyanate, 154 gms. 60% Na₂S, and enough water to bring the total volume to 1920 ml. The solution is heated in a sealed vessel 20 minutes at 225° C., the pressure rising to 375 p.s.i.g. The resulting slurry is cooled below 50° C., the solids product collected by filtration, washed free of sulfides with water at room temperature, and dried.

Example 2

A water insoluble, sulfide soluble, nickel phthalocyanine dye having 4 pendant thiocyanate groups per molecule may be prepared as follows.

An aqueous solution of

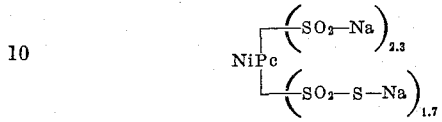

wherein NiPc is the radical of nickel phthalocyanine, is prepared in the same manner as the copper phthalocyanine sulfinate solution in Example 1 above, except that 96.5 gms. nickel phthalocyanine tetra-(3)-sulfonyl chloride are substituted for the copper phthalocyanine tetra-(4)sulfonyl chloride. 180 gms. NaCl and enough concentrated HCl to adjust to pH 2 are added to the

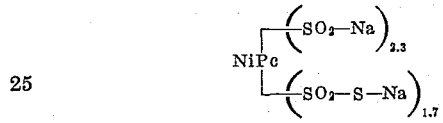

solution to precipitate it in the form of acid solids, and the solids are collected by filtration and dried.

The dried solids are powdered and blended with enough Na₂CO₃ solids so that a 10% aqueous solution of the blend would have pH 7. The dry blend is dissolved in 2065 gms. dimethyl formamide, and 304.5 gms. thiourea are added. The resulting solution is heated at atmospheric pressure for 20 hours at 145°–150° C. The resulting slurry is cooled below 50° C., the solids product collected by filtration, washed with water at room temperature and dried.

Example 3

A water insoluble, sulfide soluble, phthalocyanine dye having 4 pendant thiocyanate groups per molecule may be prepared as follows.

An aqueous solution of

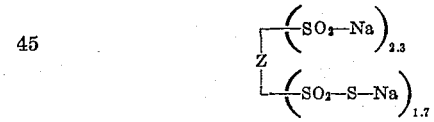

wherein Z is the radical of phthalocyanine, is prepared in the same manner as the copper phthalocyanine sulfinate solution in Example 1 above, except that 90.65 gms. phthalocyanine tetra-(4)-sulfonyl chloride are substituted for the copper phthalocyanine tetra(4)-sulfonyl chloride used in Example 1. The solution is evaporated to dryness and the solids recovered.

The dry

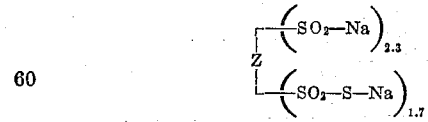

is dissolved in 2000 gms. dimethyl sulphoxide and 185 gms. technical grade ammonium thiocyanate is added. The resulting solution is heated 24 hours at 150°–155° C. at atmospheric pressure, and the resulting slurry is cooled below 50° C., the resulting solids product collected by filtration, washed with water at room temperature and dried.

Example 4

A water insoluble, sulfide soluble, copper phthalocyanine dye having an average of 3.4 pendant thiocyanate groups per molecule may be prepared as follows.

84.2 gms. of the dried copper phthalocyanine sulfinic acid having an average of 3.4 sulfinic acid groups per molecule, prepared according to Example 4 of British patent specification No. 960,643, published June 10, 1964, is powdered and blended with enough Na₂CO₃ solids so that a 10% aqueous solution thereof would have pH 7–9. The dry blend is dissolved in 2000 gms. dimethyl formamide, and 131 gms. technical grade ammonium thiocyanate is added. The resulting solution is heated at atmospheric pressure for 15 hours at 145–150° C. The resulting slurry is cooled below 50° C., the solids product collected by filtration, washed with water at room temperature and dried.

*Example 5*

A water insoluble, sulfide soluble nickel phthalocyanine dye having an average of 3.4 pendant thiocyanate groups per molecule may be prepared as follows.

83.7 gms. of dried nickel phthalocyanine sulfinic acid having an average of 3.4 sulfinic acid groups per molecule is prepared according to Example 4 of British patent specification No. 960,643, published June 10, 1964, except that 9.65 parts nickel phthalocyanine tetra-(4)-sulfonyl chloride are substituted for the 9.7 parts copper phthalocyanine tetra-(3)-sulfonyl chloride used therein.

The dried nickel phthalocyanine sulfinic acid is powdered and blended with enough Na₂CO₃ solids so that a 10% aqueous solution thereof would have pH 7–9. The dry blend is dissolved in 1800 gms. dimethyl sulphoxide, and 131 gms. technical grade ammonium thiocyanate is added. The resulting solution is heated at atmospheric pressure for 22 hours at 150–155° C. The resulting slurry is cooled below 50° C., the solids product collected by filtration, washed with water at room temperature and dried.

*Example 6*

A water insoluble, sulfide soluble, phthalocyanine dye having an average of 3.4 pendant thiocyanate groups per molecule may be prepared as follows.

78 gms. dried phthalocyanine sulfinic acid having an average of 3.4 sulfinic acid groups per molecule is prepared according to Example 4 of British patent specification No. 960,643, except that 9.09 parts phthalocyanine tetra-(3)-sulfonyl chloride is substituted for the 9.7 parts copper phthalocyanine tetra-(3)-sulfonyl chloride used therein.

The dried phthalocyanine sulfinic acid is dissolved in water with enough NaOH to give a final solution of 1800 ml. and pH 7–9; 131 gms. thiourea is added. The solution is heated in a sealed vessel 25 minutes at 200°–205° C., the pressure rising to 320–350 p.s.i.g. The resulting slurry is cooled below 50° C., the solids product collected by filtration, washed with water at room temperature and dried.

*Example 7*

A water insoluble, sulfide soluble, copper phthalocyanine dye having 3 pendant thiocyanate groups per molecule may be prepared as follows.

An aqueous solution of

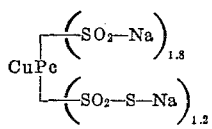

wherein CuPc is the radical of copper phthalocyanine, is prepared by stirring 87.15 gms. copper phthalocyanine tri-(3)-sulfonyl chloride with ice and water to 900 ml. volume at 0° C., and 3 drops tributyl phosphate anti-foaming agent are added. The pH is adjusted to 7 by adding 15% NaOH at room temperature to the cold mass. 51.9 gms. of 43% aqueous NaSH solution at room temperature is added to the cold mass, and the mass is stirred 12–15 hours while being permitted to warm to room temperature naturally. The solution is evaporated to dryness. The dried

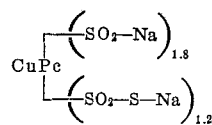

is powdered and dissolved in 1800 gms. dimethyl sulphoxide, and 137 gms. thiourea is added. The resulting solution is heated at atmospheric pressure for 12 hours at 150–155° C. The resulting slurry is cooled below 50° C., the solids product collected by filtration, washed with water at room temperature and dried.

*Example 8*

A water insoluble, sulfide soluble nickel phthalocyanine dye having 3 pendent thiocyanate groups per molecule may be prepared as follows.

An aqueous solution of

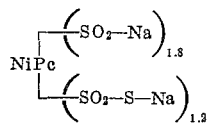

wherein NiPc is the radical of nickel phthalocyanine, is prepared in the manner described in Example 7, except that 86.7 gms. nickel phthalocyanine tri-(4)-sulfonyl chloride is substituted for the 87.15 gms. copper phthalocyanine tri-(3)-sulfonylchloride used in Example 7.

To the resulting

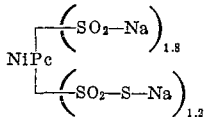

solution are added 160 gms. thiourea, 154 gms. 60% Na₂S, and enough water to bring the final volume to 2200 ml. The solution is heated in a sealed vessel 25 minutes at 200–205° C., the pressure rising to 320–350 p.s.i.g. The resulting slurry is cooled below 50° C., the solids product collected by filtration, washed free of sulfides with water at room temperature, and dried.

*Example 9*

A water insoluble, sulfide soluble, phthalocyanine dye having 3 pendant thiocyanate groups per molecule may be prepared as follows.

An aqueous solution of

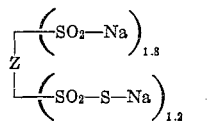

wherein Z is the radical of phthalocyanine, is prepared in the manner described in Example 7, except that 80.1 gms. phthalocyanine tri-(3)-sulfonyl chloride are substituted for the copper phthalocyanine tri-(3)-sulfonyl chloride used in Example 7. 180 gms. NaCl and enough concentrated HCl are added to the

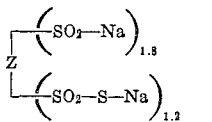

solution to adjust to pH 2 and precipitate it in the form of acid solids. The solids are collected by filtration and dried.

The dried solids are powdered and blended with enough Na₂CO₃ solids so that a 10% aqueous solution thereof would have pH 8–9. The dry blend is dissolved in 2000 gms. dimethyl formamide, and 230 gms. thiourea are added. The resulting solution is heated at atmospheric pressure for 24 hours at 135° C. The resulting slurry is cooled below 50° C., the solids product collected by filtration, washed with water at room temperature and dried.

*Example 10*

A water insoluble, sulfide soluble, copper phthalocyanine dye having 2 pendant thiocyanate groups per molecule may be prepared as follows.

78.4 gms. of the dried copper phthalocyanine sulfinic acid having two sulfinic acid groups per molecule, prepared according to Example 1 of British patent specification No. 960,643, published June 10, 1964, is dissolved in water with enough $Na_2CO_3$ to give a final solution of 200 ml. and pH 10. 122 gms. thiourea are added. The solution is heated in a sealed vessel 24 hours at 135° C., the pressure rising to 35 p.s.i.g. The resulting slurry is cooled below 50° C., the solids product collected by filtration, washed with water at room temperature and dried.

*Example 11*

A water insoluble, sulfide soluble, nickel phthalocyanine dye having 2 pendant thiocyanate groups per molecule may be prepared as follows.

An aqueous solution of

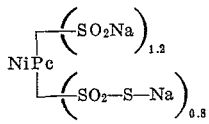

wherein NiPc is the radical of nickel phthalocyanine, is prepared by stirring 76.8 gms. nickel phthalocyanine di-(4)-sulfonyl chloride with ice and water to 700 ml. volume at 0° C.; adding 3 drops tributyl phosphate antifoaming agent; adjusting to pH 5 with 15% aqueous NaOH; adding 34.6 gms. 60% $Na_2S$ dissolved in 150 ml. water at room temperature, and enough ice to maintain the mass at 0° C. during addition of the $Na_2S$; and stirring 12–15 hours while permitting it to warm to room temperature naturally. 180 gms. NaCl and enough concentrated HCl are added to the aqueous solution of

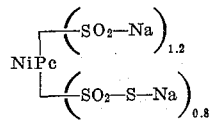

to adjust to pH 2 and precipitate it in the form of acid solids, which are collected by filtration and dried.

The dried solids are powdered and blended with enough $Na_2CO_3$ solids so that a 10% aqueous solution of the blend would have pH 7. The dry blend is dissolved in 1500 gms. dimethyl formamide; 38.5 gms. technical grade ammonium thiocyanate and 118.5 gms. ammonium bicarbonate are added. The resulting solution is heated 20 hours at 145–150° C., and the resulting slurry is cooled below 50° C., the solids product collected by filtration, washed with water at room temperature and dried.

*Example 12*

A water insoluble, sulfide soluble, copper phthalocyanine dye having an average of 1.5 perdant thiocyanate groups per phthalocyanine molecule, may be prepared as follows.

79.2 gms. of the copper phthalocyanine sulfinic acid having an average of 1.5 sulfinic acid groups per copper phthalocyanine molecule is prepared according to Example 6 of British patent specification No. 960,643, published June 10, 1964.

The dried copper phthalocyanine sulfinic acid is powdered and blended with enough $Na_2CO_3$ solids so that a 10% aqueous solution thereof would have pH 7. The dry blend is dissolved in 1500 gms. dimethyl sulphoxide, 23.1 gms. technical grade ammonium thiocyanate, and 57.6 gms. ammonium carbonate are added. The resulting solution is heated at atmospheric pressure for 24 hours at 135° C. The resulting slurry is cooled below 50° C., the solids product collected by filtration, washed with water at room temperature and dried.

*Example 13*

A water insoluble, sulfide soluble, copper phthalocyanine dye having one pendant thiocyanate group per copper phthalocyanine molecule may be prepared as follows.

An aqueous solution of

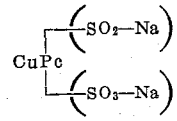

wherein CuPc is the radical of copper phthalocyanine is prepared by adding 77.3 gms. copper phthalocyanine di-(3)-sulfonyl chloride to a stirring solution of 50.5 gms. sodium sulfite in 500 ml. water maintained at 20°–30° C. during the addition and also maintained at pH 9–9.5 by adding soda ash as required. The resulting solution is stirred 10 hours at room temperature. 75 gms. NaCl is added, and enough concentrated HCl to precipitate the sulfinate as a sulfinic acid. The sulfinic acid is collected by filtration, washed with 300 ml. 5% aqueous HCl, and collected as moist press cake.

The moist press cake is dissolved in water with addition of enough $NH_4OH$ to give pH 10 and a volume of 1,900 ml. 30.8 gms. ammonium thiocyanate is added, and the resulting solution is heated in a sealed vessel 1 hour at 180° C. The resulting slurry is cooled to below 50° C., the solids product collected by filtration, washed with water at room temperature and dried.

*Example 14*

A water insoluble, sulfide soluble copper phthalocyanine dye having 4 pendant thiocyanate groups per molecule may be prepared as follows.

An aqueous solution of water soluble copper phthalocyanine of the formula

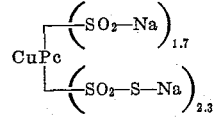

wherein CuPc is the radical of copper phthalocyanine, is prepared by slurrying 97 gms. copper phthalocyanine tetra-(3)-sulfonyl chloride with ice and water to 960 ml. volume at 0° C., adjusting the pH to 7 by adding 15% aqueous NaOH at room temperature to the cold mass, adding 3 drops tributyl phosphate, adding 77.9 gms. 43% aqueous NaSH solution at room temperature, and stirring 3 hours while permitting it to warm to room temperature naturally.

The aqueous solution is transferred to a pressure reaction vessel; 307 gms. technical grade ammonium thiocyanate, 153.5 gms. 60% $Na_2S$, and enough water to dilute the mass to 1920 ml. are added. The resulting solution is heated in a sealed vessel to 200° C., and held at 200°–210° C. for 25 minutes, a pressure of about 320–350 p.s.i.g. resulting. The resulting slurry is cooled below 50° C., the solids product recovered by filtration, washed with water at room temperature, and dried at 80° C.

What is claimed is:

1. A method for making a water insoluble, sulfide soluble dyestuff of the phthalocyanine series having 1–4 pendant thiocyanate (SCN) groups per phthalocyanine molecule, comprising the step of heating at 135°–225° C. and pH 5–10 in a sealed pressure vessel until the dyestuff precipitates an excess of ammonium thiocyanate or thiourea with an aqueous solution of a sulfinate of phthalocyanine, a sulfinate of copper phthalocyanine or a sulfinate of nickel phthalocyanine, wherein said sulfinates of said phthalocyanines have 2–4 substituents including an average of 1–3.4 pendant sulfinate groups per phthalocyanine molecule as substituents for hydrogen in the arylene nuclei of the phthalocyanines and in which any remaining substituents are pendant thiolsulfonate or pendant sulfonate groups.

2. A method as defined in claim 1, and further characterized in that said sulfinate has the formula

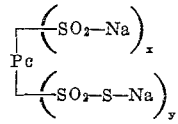

wherein Pc is the radical of phthalocyanine, copper phthalocyanine or nickel phthalocyanine, $x$ is a number from 1.2–2.3, $y$ is a number from 0.8–2.3 and $x+y$ is a number from 2–4.

3. A method as defined in claim 1, and further characterized in that said sulfinate has the formula

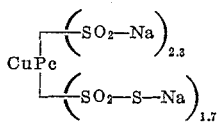

and in that an excess of thiourea is utilized, wherein CuPc is the radical of copper phthalocyanine.

4. A method for making a water insoluble, sulfide soluble dyestuff of the phthalocyanine series having 1–4 pendant thiocyanate (SCN) groups per phthalocyanine molecule, comprising the step of heating at 135°–225° C. and pH 5–10 until the dyestuff precipitates an excess of ammonium thiocyanate or thiourea with an organic solvent solution of a sulfinate of phthalocyanine, a sulfinate of copper phthalocyanine or a sulfinate of nickel phthalocyanine, wherein said sulfinates of said phthalocyanines have 2–4 substituents including an average of 1–3.4 pendant sulfinate groups per phthalocyanine molecule as substituents for hydrogen in the arylene nuclei of the phthalocyanines and in which any remaining substituents are pendant thiolsulfonate or pendant sulfonate groups, said solvent being unreactive with the reactants and having a boiling point of at least 135° C. under the reaction conditions.

5. A method as defined in claim 4, and further characterized in that said heating is at 135°–155° C. and in that said organic solvent is dimethyl formamide or dimethyl sulphoxide.

References Cited

UNITED STATES PATENTS 2,395,117  2/1946  Haddock.

FOREIGN PATENTS 960,643  6/1964  Great Britain.

JOHN D. RANDOLPH, *Primary Examiner.*

WALTER A. MODANCE, *Examiner.*

H. I. MOATZ, *Assistant Examiner.*